United States Patent
Mestha et al.

(10) Patent No.: US 8,179,566 B2
(45) Date of Patent: May 15, 2012

(54) METHOD FOR CLASSIFYING A PRINTER GAMUT INTO SUBGAMUTS FOR IMPROVED SPOT COLOR ACCURACY

(75) Inventors: Lalit Keshav Mestha, Fairport, NY (US); Alvaro Enrique Gil, Rochester, NY (US); Matthew Hoffmann, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 673 days.

(21) Appl. No.: 11/959,824

(22) Filed: Dec. 19, 2007

(65) Prior Publication Data

US 2009/0161125 A1    Jun. 25, 2009

(51) Int. Cl.
*G06F 15/00* (2006.01)

(52) U.S. Cl. ......... 358/1.9; 358/508; 358/504; 382/167; 382/162; 345/604; 345/601; 345/600; 345/590; 345/589

(58) Field of Classification Search .............. 358/1.9, 358/518, 504; 382/167, 162; 345/604, 601, 345/600, 590, 589

See application file for complete search history.

(56) References Cited

U.S. PATENT DOCUMENTS

| | | | |
|---|---|---|---|
| 4,812,899 A | | 3/1989 | Kueppers |
| 5,553,199 A | * | 9/1996 | Spaulding et al. ............. 358/1.9 |
| 6,636,628 B1 | * | 10/2003 | Wang et al. ................... 382/167 |
| 6,744,531 B1 | * | 6/2004 | Mestha et al. ................ 358/1.9 |
| 2005/0030560 A1 | | 2/2005 | Maltz et al. |
| 2008/0043263 A1 | | 2/2008 | Hancock et al. |
| 2008/0043271 A1 | | 2/2008 | Gil et al. |

OTHER PUBLICATIONS

Balasubramanian, R. and Dalal, E., "A method for quantifying the color gamut of an output device", Proceedings of SPIE, vol. 3018, pp. 110-116, San Jose, Calif., Jan. 1997.

H. Boll, "A color to colorant transformation for a seven ink process", IS&T/SPIE Symposium on Electronic Imaging, Science & Technology; Feb. 6-10, 1994; San Jose, California.

Cholewo, et al., "Gamut boundary determination using alpha-shapes", $7^{th}$ Color Imaging Conference, Scottsdale, Ariz.), Nov. 1999.

Viassolo, et al., "Practical algorithm for the inversion of an experimental input-output color map for color correction", SPIE Journal of Optical Engineering, Mar. 2003.

Dianat, et al., "Dynamic optimization algorithm for generating inverse printer map with reduced measurements", IEEE Int. Conference on Acoustics, Speech, and Signal Processing, May 14-19, 2006, Toulouse, France.

* cited by examiner

*Primary Examiner* — Benny Q Tieu
*Assistant Examiner* — Paul F Payer
(74) *Attorney, Agent, or Firm* — Fay Sharpe LLP

(57) ABSTRACT

A method is provided for classifying a color printer gamut into a plurality of gamut subclasses including representing the color printer gamut as a composite of gamut classes wherein each gamut class is comprised of a subset of printer color separations; and, assigning selected spot color targets to determined ones of the gamut classes. The method further includes determining if the selected spot color target is located inside, or on-boundary, or outside of the gamut classes.

13 Claims, 6 Drawing Sheets

METHOD FOR CLASSIFYING A PRINTER GAMUT INTO SUBGAMUTS FOR IMPROVED SPOT COLOR ACCURACY

TECHNICAL FIELD

The disclosed embodiments generally relate to methods and systems for printer color management in image/text printing or display systems. The embodiments are directed to processes for generating improved spot color accuracy for achieving machine-to-machine consistency, and more particularly to printers with common raster image processing requiring spot color CMYK values to be generated by the printer engine.

BACKGROUND

To meet customer demand, the commercial printing industry requires the capability of producing spot colors accurately and consistently. Spot colors can be defined as a fixed set of colors which may be Pantone® colors, customer logo colors, colors in a customer's proprietary marked patterns, or customer defined colors in the form of an index color table. Spot colors are often used, or can be used, for large background areas, which may be the most color critical portion of a particular page. Consistent color in these areas may determine the difference between success and failure in meeting customer requirements. Customer demands for color accuracy and consistency are typically much tighter for spot colors than for colors within images.

Existing spot color editors utilize a manual approach to the adjustment of CMYK combinations of spot colors prior to raster image processing (RIPing). For example, the document creator may select a Pantone® color for application in specific areas through a user interface on a printing device or computer monitor, such as that available on the Xerox® DocuSP® Controller. The Pantone-provided CMYK combination for the selected printer is obtained from a look-up table. Prior to RIPing the document in the printer, the operator has the option of entering a spot color editor function and specifying an alternative CMYK combination to achieve the desired color. The document is then RIPed and then printed using the spot color editor combinations where specified, and Pantone combinations otherwise.

This workflow presents various problems, among which is operator error associated with manual adjustments of the CMYK combinations; modifications to the CMYK values may result in more variability from machine to machine. Also, the manually-adjusted CMYK values may require more iteration to achieve the desired color. Due to the manual adjustments it may be difficult for customers to achieve the correct CMYK combinations even after repeated trials.

For some customers, the process of manually adjusting spot colors is far too difficult or time consuming. These customers will always use the built-in static CMYK spot color dictionary and are forced to accept the potentially large accuracy errors that can occur with long term printer variation.

An automated spot color editor (ASCE) method includes determining appropriate target values for a selected color within a print job. The selected color may be described as being within a color space such as reflectance spectra, L*a*b*, XYZ, LHC, CMYK, RGB, parameters describing color, or a color number. The automated spot color editor modifies or adjusts the selected color by selecting a quality level and a maximum number of iterations. During iterations it computes the CMYK recipe for each spot color until a quality level is reached.

CMYK recipes are computed inside an algorithm module. The basic algorithm requires the use of gamut classification to find the CMYK recipe accurately and in the course of doing so save toner usage. Also, this kind of classification can help to improve the overall attainable gamut by fully utilizing the black separation.

A related problem in the implementation of an ASCE hard copy proof concept is determining whether a given color is either inside/on-boundary or outside of the printer's gamut. Colors located very near or on the gamut's boundary could have mistakenly been reported as outside the gamut by algorithms that are not accurate enough. A color that is wrongly considered as outside the gamut will be handled by the gamut mapping algorithm currently implemented in the ASCE application. Thus, this mapping algorithm will, in turn, map the colors in reference to a point in the surface of the printer's gamut. The ASCE control algorithm will iterate to seek to match the given mapped color. The consequence of this action might lead to the reproduction of a color that is slightly "off" from the original one when this could have been avoided since there was no need to map the original color.

There is thus a need for providing an accurate method to determine colors that are on the gamut's boundary.

There is also always a need for improved accuracy in the ASCE feature, and in particularly enhanced accuracy in the performance of any spot colors (arbitrary or customer specified) using inline or offline sensors.

SUMMARY

A method is provided for classifying a color printer gamut into a plurality of gamut subclasses. The overall color printer gamut is represented as a composite of the gamut subclasses wherein each gamut subclass is comprised of a subset of printer color separations. Selected spot color targets are assigned to determine ones of the gamut subclasses for efficiently calculating the CMYK color separation values for a given spot color target. By way of example, four gamut classes (CMY->L*a*b*; MYK->L*a*b*, CYK->L*a*b* and CMK->L*a*b*), and a neutral zone are implemented for assigning appropriate gamuts for each incoming spot color target. This approach reduces the dimensionality of the four color process to three color groups. Use of partitioned gamuts provides (1) improved spot color accuracy with one of the separations always held to zero, (2) improved toner usage for high area coverage spot color printing by identifying the most toner efficient CMYK values for each spot color, (3) more room for the controller on the actuators when the spot colors under consideration are common to two or more gamut classes, and (4) allows for a unique solution for each spot color once a gamut class has been chosen.

A method is also disclosed that is used by the Automated Spot Color Editor (ASCE) to determine accurately whether a given set of colors is either inside/on-boundary or out-of-boundary of one or more gamut classes. A forward printer model is available a priori and the target L*a*b* values for each spot color of interest are known. This method uses the following computational steps: (1) a local printer inverse model and an estimate of the CMYK values (obtained by using the iteratively clustered interpolation (ICI) algorithm) associated to each target L*a*b* values of the spot color, (2) these CMYK values are used to produce an estimate of the new L*a*b* values using the forward printer model, and (3) criteria such as CIE LAB or deltaE2000 between the estimated and target L*a*b* values are compared to a threshold to conclude whether a given color is inside/on-boundary or outside of a group of gamut classes. The proposed method simultaneously provides two solutions; (1) makes decisions about whether or not each spot colors are located in-out or on the boundary and (2) performs gamut mapping for spot colors that are out-of-gamut using "minimum deltaE criteria". The mapping strategy preserves the minimum deltaE between out-of-gamut colors to the nearest gamut boundary automatically. A perceptual deltaE (i.e., deltaE2000) is more preferred for spot colors.

DETAILED DESCRIPTION

Figure 1A:
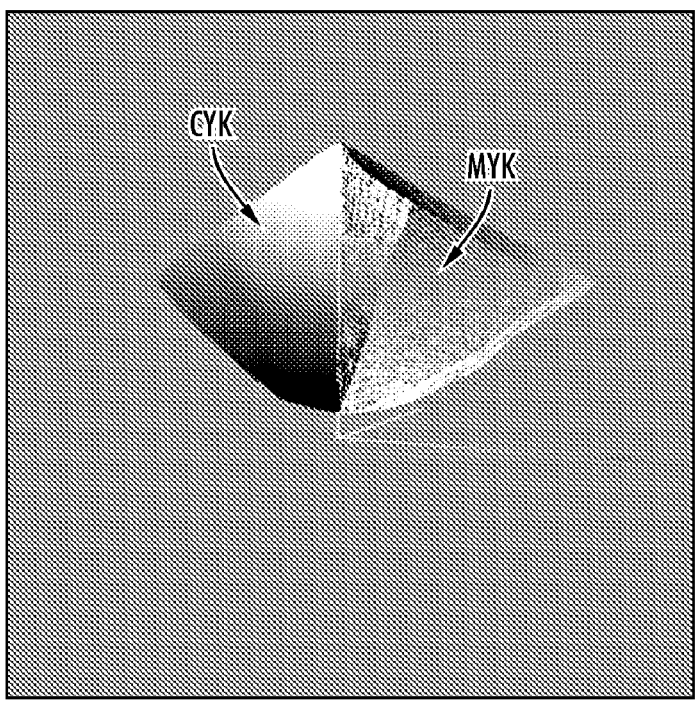
FIG. 1a shows an overall printer gamut being partitioned into subclass gamuts CYK and MYK.
Figure 1B:
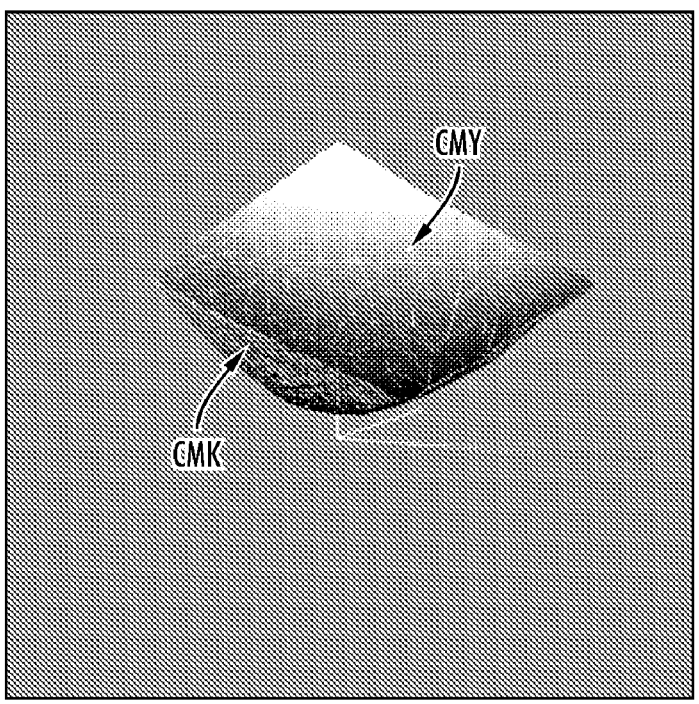
FIG. 1b shows the overall printer gamut being partitioned into subgamuts CMK, CMY.
Figure 2A:
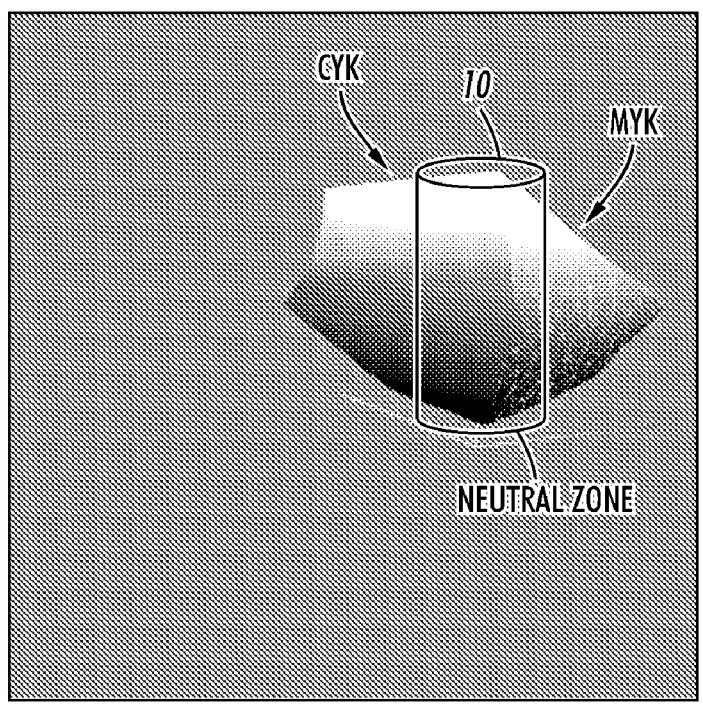
FIG. 2a shows the overall printer gamut being partitioned into subgamuts CYK and MYK and further shows a neutral zone 30.
Figure 2B:
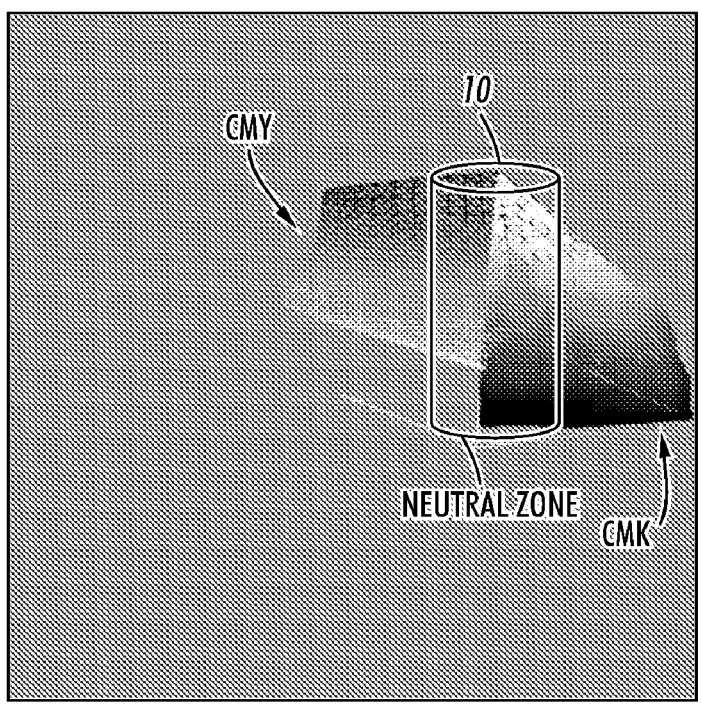
FIG. 2b shows the overall printer gamut being partitioned into subgamuts CMY and CMK and the neutral zone 30 relative thereto.

The presently disclosed embodiments divide the overall CMYK->L*a*b* gamut into four gamut classes and a neutral zone. FIGS. 1a and 1b show in L*a*b* space these four CMY->L*a*b*; MYK->L*a*b*, CYK->L*a*b* and CMK->L*a*b* gamut classes. The overall gamut is the union of all these gamut classes. FIGS. 2a and 2b show an additional region 10 classified as a "neutral zone". This approach reduces the dimensionality of the four color process to three color groups. As a result of this, a 3-input 3-output MIMO control algorithm can be implemented to achieve improved spot color accuracy.

For the purpose of the disclosed embodiments, these gamut classes are representations of color reproduction capability of a printer obtained by considering three separations at a time. This could be a forward color model obtained via experimentation on a representative four color printer or a mathematical construct whose sole purpose is to relate input separations to output color. Each gamut represents the volume of color space swept out by the forward model when all combinations of corresponding separations are fed in.

Figure 3:
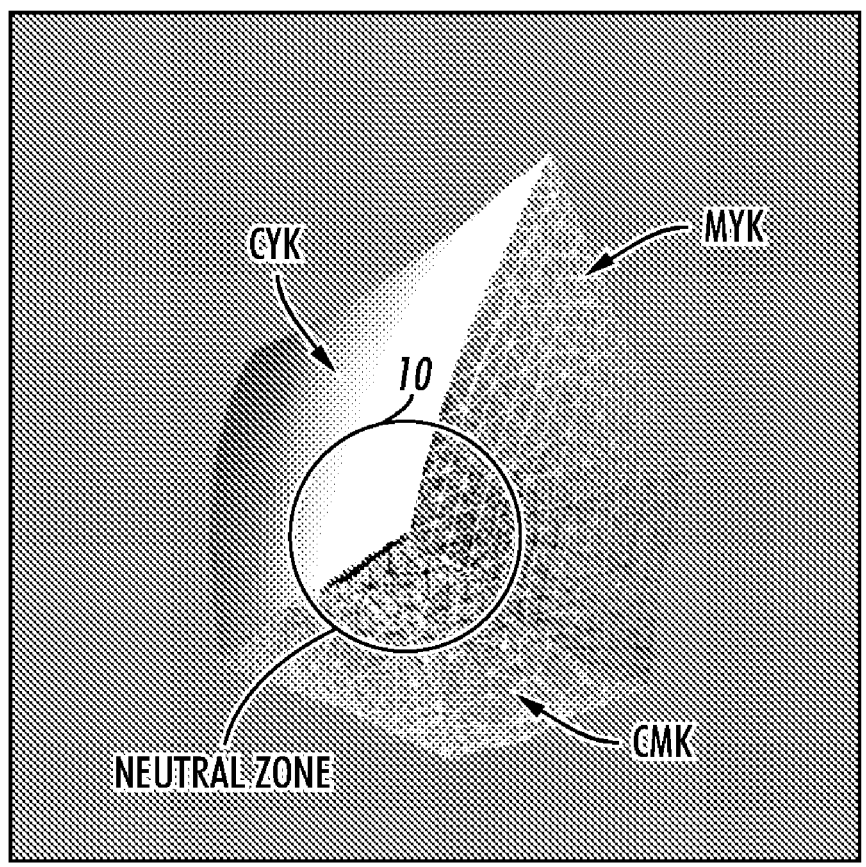
FIG. 3 is an alternative view of the overall printer gamut showing subgamuts CMK, MYK and CYK and the neutral zone 30.

There is a high degree of overlap between CMY gamut with other classes that include K separation. The overlapping CMY gamut with CMK, CYK and MYK gamuts can cause problems while assigning customer colors to appropriate gamut classes. Whereas the overlap region with CMK, CYK and MYK gamuts is low. FIG. 3 shows the CMK, MYK and CYK gamuts along the chromatic axes when viewed from the top of the gamut. Overlap regions are insignificant with each of these gamuts.

To avoid the problem of high degree of overlap with CMY gamut class, and to preserve the appearance of images, the neutral region (or zone) 10 is defined using deltaE metrics. In some cases, this neutral region may not be needed. This region, as shown in FIGS. 2a and 2b geometrically looks like a cylinder of circular cross section in three-dimensional space when the cylinder is specified with deltaE (in CIELab space) as a radius from the neutral axis. It is not quite cylindrical in shape when the radius is specified in deltaE2000 or perceptual space.

Further, assigning spot colors to a particular gamut class/zone is accomplished using the algorithm described below. Often, when the use of minimum or maximum black separation is needed, we show a classification algorithm without the use of neutral region.

Classification Algorithm with Neutral Zone:

At a high level this strategy tries to preserve the following rule.

Figure 6:
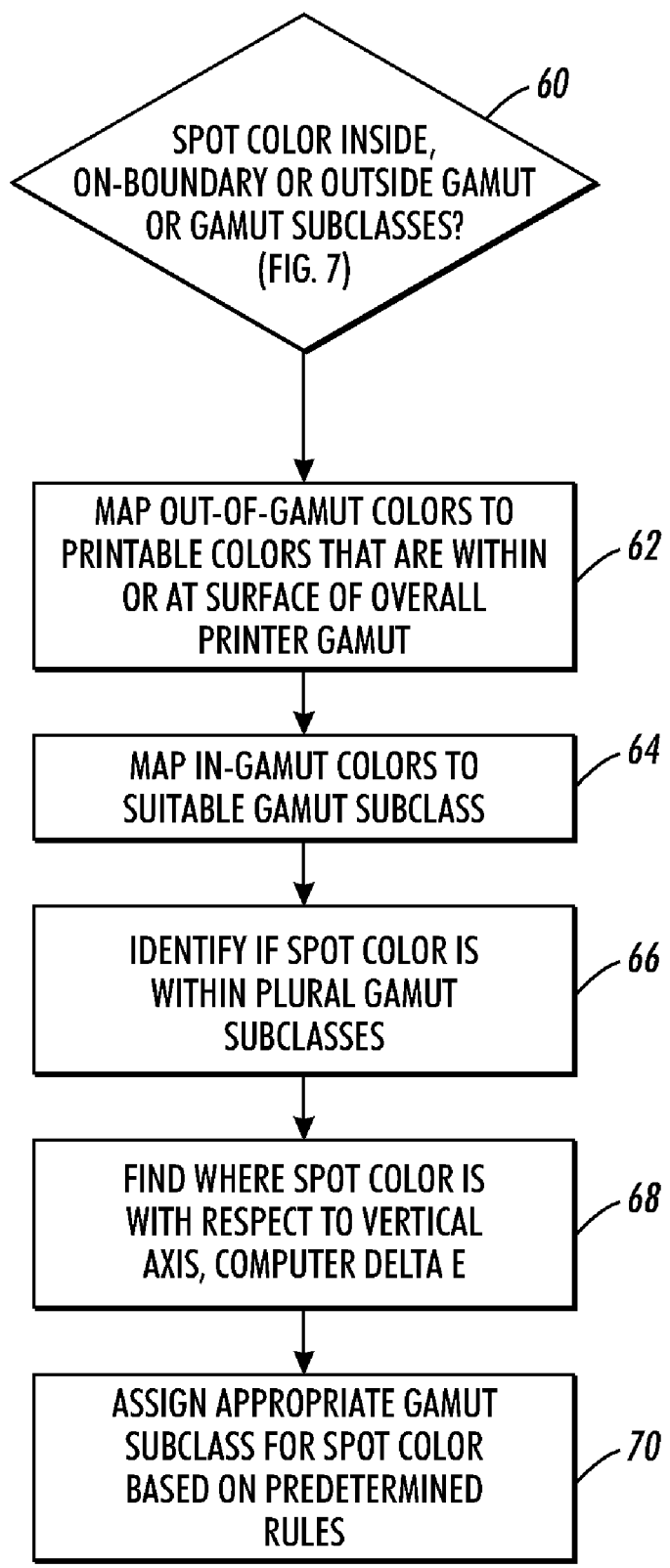
FIG. 6 is a flowchart of a method for classifying printer gamuts to provide improved spot color accuracy; and, FIG. 7 is a flowchart of a method for determining whether or not spot colors located inside, on-boundary or outside the device or gamut subclasses.

Whenever there is overlap with CMY gamut class, (a) use one of the gamut classes with black separation when the spot colors are inside the neutral zone, and (b) use a CMY gamut class for colors outside the neutral zone. Detailed steps are shown below with reference to FIG. 6.

Step #1: First check 60 whether the target color is inside or outside the overall gamut of the printer. This can be done using ray tracing or other algorithms. An accurate method used in ASCE algorithm module is described below with reference to FIG. 7.

Step #2: Map 62 out-of-gamut colors to printable colors which are within or at the surface of the overall gamut. There are many ways to do this. There will be trade-off in how much hue, chroma and lightness error is incurred in re-mapping the out-of-gamut color. If colors fall inside the overall gamut, then preserve 64 the colors without performing any gamut mapping.

Next step is to find the gamut subclass suitable for printing these colors. In this step, there could be one or multiple combination possibilities due to overlapping gamut subclasses (i.e., CMY & CMK or CMY & MYK or CMY & CYK, etc.)

Step #3: Determine 66 whether the color is inside one, two, three or four gamut classes. Store deltaE numbers (in CIE or 2000 space) of colors with respect to the original L*a*b* values of the spot colors (i.e., store de_CMY, de_MYK, de_CYK, de_CMK values). Let gamut class index be defined by the notation 'g'.

Additional checks are required to assign appropriate gamut classes and make sure that the colors are printed with black toner when they are inside the neutral zone.

Step #4: Find 68 where the spot color is with respect to the neutral axis. This is done by computing deltaE of the spot color with respect to the neutral axis. That is, deltaE is computed on the chroma plane of the spot color by comparing L*a*b* values to L*,0,0.

Step #5: Now the appropriate gamut class index is assigned 70 by following the rules shown in Table 1. Notice that the numbers 1) and 2) inside a cell denote the sequence in which the steps are applied in the algorithm. Also, the algorithm selects one out of all the options shown in items C and D.

TABLE 1

|  | Is DeltaEwrt_neutral < deltaE tolerance? | 1-gamut | 2-gamut | 3-gamut | 4-gamut |
|---|---|---|---|---|---|
| Inside CMY gamut | Yes | B | C | 1)D, 2)G(b) | 1)E, 2)G(c) |
| | No | | Pick CMY gamut class (i.e., execute steps A followed by G(a)) | | |
| Outside CMY gamut | Yes or No | C | 1)D, 2)G(b) | 1)E, 2)G(c) | N/A |

[Note Items A, B. C, etc. in Table 1 correspond to elements A, B, C, etc. in the following paragraph.]

Gamuts (L*a*b* values not shown for simplicity): CMYK=0 (overall gamut), CMY=1, MYK=2, CYK=3, CMK=4.

A. Compute CMY values using printer model.
   B. Compute gamut class number=g=arg min(de_MYK, de_CYK, de_CMK)+1, where de_MYK, de_CYK and de_CMK are deltaE numbers (in CIE or 2000 space) of colors with respect to the original L*a*b* values of the spot colors.
   C. Compute MYK (g=2), CYK (g=3), CMK (g=4) values using printer model. Chose appropriate gamut index, g.
   D. Compute MYK-CYK, MYK-CMK, CYK-CMK values using printer model.
   E. Compute MYK-CYK-CMK, values using printer model.
   F. Compute CMY-MYK-CYK-CMK values using printer model.
   G. Select gamuts (g)
      a. g=1 (select CMY gamut)
      b. Compute minMYK=min(MYK) & minCYK=min(CYK); g=arg max(minMYK, minCYK) [gamut selection is shown for MYK-CYK gamut. Similar algorithm is used for other such 2-gamut classes]
      c. Compute minMYK=min(MYK), minCYK=min(CYK) & minCMK=min(CMK); g=arg max(minMYK, minCYK, minCMK) [gamut selection is shown for MYK-CYK-CMK gamut. Similar algorithm is used for other such 3-gamut classes]
      d. Compute minCMY=min(CMY), minMYK=min(MYK), minCYK=min(CYK) & minCMK=min(CMK); g=arg max(minCMY, minMYK, minCYK, minCMK)

An ICI algorithm described in U.S. Pat. No. 6,636,628, the disclosure of which is incorporated herein by reference in its entirety, (or other well known methods) can be used to compute printer inverse from the overall printer model for each of the gamut classes. The ICI algorithm with a uniformly sampled (13 cube) forward LUT obtained experimentally on iGen 3 for each of the gamut classes.

Other criteria for selecting gamut classes, g, for items G(b), G(c), and G(d) could also be implemented. The criteria for G(b) is only shown for simplicity; the options for G(c) and G(d) can be easily deducted after the G(b) definition. The additional options are as follows:

1) Compute minMYK=min(255−max(MYK),min(MYK)) & minCYK=min(255−max(CYK),min(CYK)); g is computed as above.
   2) Compute g=min(‖MYK−[127.5 127.5 127.5]‖,‖CYK−[127.5 127.5 127.5]‖), where ‖a‖ represents the norm of the vector a.

Notice that all these criteria select a gamut class that provides more room for actuation to the ASCE controller since it tries to get away, if possible, from the saturation zone of the actuators (i.e., the CMYK values).

Classification Algorithm without Neutral Zone:

Whenever there is overlap with CMY gamut class, at a high level this strategy has two components: (1) minimum black strategy, and (2) maximum black strategy. For minimum black strategy, use CMY gamut class wherever possible. For maximum black strategy, use black everywhere (i.e., no CMY gamut is used). We do not use this strategy in our current ASCE algorithm. However, for completion, we would like the idea included in the patent.

Accordingly, the classifying of the overall printer gamut into gamut subclasses of a reduced number of color separations provides novel advantages. The mere representing of the overall gamut of a four color printer into four gamut sub-classes and a neutral zone affords substantial toner savings while maintaining accurate control of the spot colors. The foregoing gamut classification algorithm that assigns the most appropriate gamut for each spot target simplifies color processing and enhances color accuracy.

More particularly, the disclosed embodiments reduce the dimensionality of the four color process to three color groups. Use of partitioned gamuts provide (1) improved spot color accuracy with one of the separations always held to zero, (2) improved toner usage for high area coverage spot color printing by identifying the most toner efficient CMYK values for each spot color, (3) more room for the controller on the actuators when the spot colors under consideration are common to two or more gamut classes, and (4) allows for a unique solution for each spot color once a gamut class has been chosen.

Figure 5:
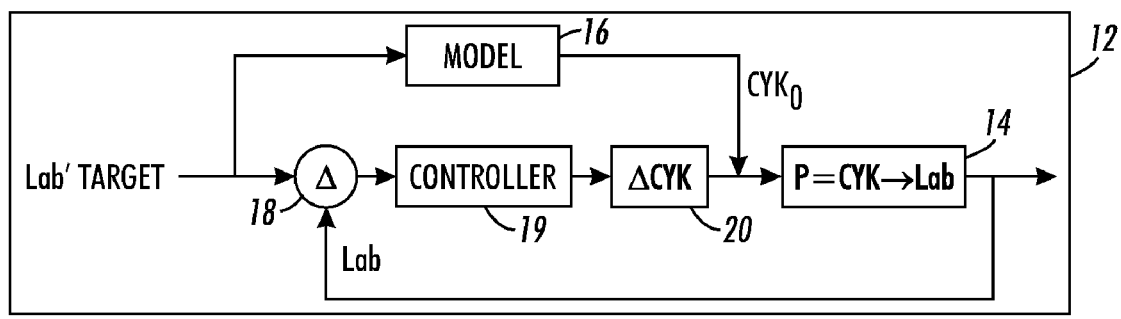
FIG. 5 is a model diagram showing the processing algorithm for matching target L*a*b* spot colors to printer output colors for enhanced accuracy.

With reference to FIG. 5, the color accuracy enhancement is demonstrated for an exemplary gamut class, CYK, wherein the printer 12 includes a CYK to L*a*b* gamut 14. The L*a*b* target spot color is printed using a known CYK for that target which is the initial $CYK_0$ derived from inverted model 16. If CYK zero is not equal to the desired target color, a delta 18 between L*a*b* target and the actual output L*a*b* is applied to generate from a control algorithm executed by controller 19, a delta CYK 20 which is added to the $CYK_0$ to minimize the difference between output L*a*b* and target L*a*b*, hence, the desired color accuracy. Controller 19 operates the algorithm in accordance with the teaching of U.S. Pat. No. 6,744,531, herein incorporated by reference.

Spot Color Location Relative to Gamut Boundary

One of the key components in the implementation of the ASCE hard copy proof concept is determining whether a given color is either inside/on-boundary or outside of a printer's gamut. Colors located very near or on the gamut's boundary could have mistakenly been reported as outside the gamut by algorithms that are not accurate enough. A color that is wrongly considered as outside the gamut will be handled by the gamut mapping algorithm currently implemented in the ASCE application. Thus, this mapping algorithm will, in turn, map the colors in reference to a point in the surface of the printer's gamut. The ASCE control algorithm will iterate to seek to match the given mapped color. The consequence of this action might lead to the reproduction of a color that is slightly "off" from the original one when this could have been avoided since there was no need to map the original color. The disclosed embodiments comprise a method for providing an accurate method to determine colors that are on the gamut's boundary. The same methodology is applied for colors inside or outside the printer's gamut though. Also, the algorithm considers the fact that the whole printer's gamut is divided into four gamut classes: CMY, CMK, CYK, and MYK.

The embodiments present a methodology to determine where colors are located with respect to gamut classes (i.e., inside/on-boundary or outside). This information not only causes a good reproduction of the colors contained in the hard copy sample by the ASCE control algorithm, but also avoids the inclusion of a separate gamut mapping algorithm in the ASCE algorithm.

Apart from being more accurate, the uniqueness of the proposed method is in the use of ICI algorithm, which simultaneously provides two solutions; (1) makes decisions about whether or not each spot colors are located in-out-on the boundary and (2) performs gamut mapping for spot colors that are out-of-gamut. The strategy used preserves the minimum deltaE between out-of-gamut colors to the nearest gamut boundary.

Figure 7:
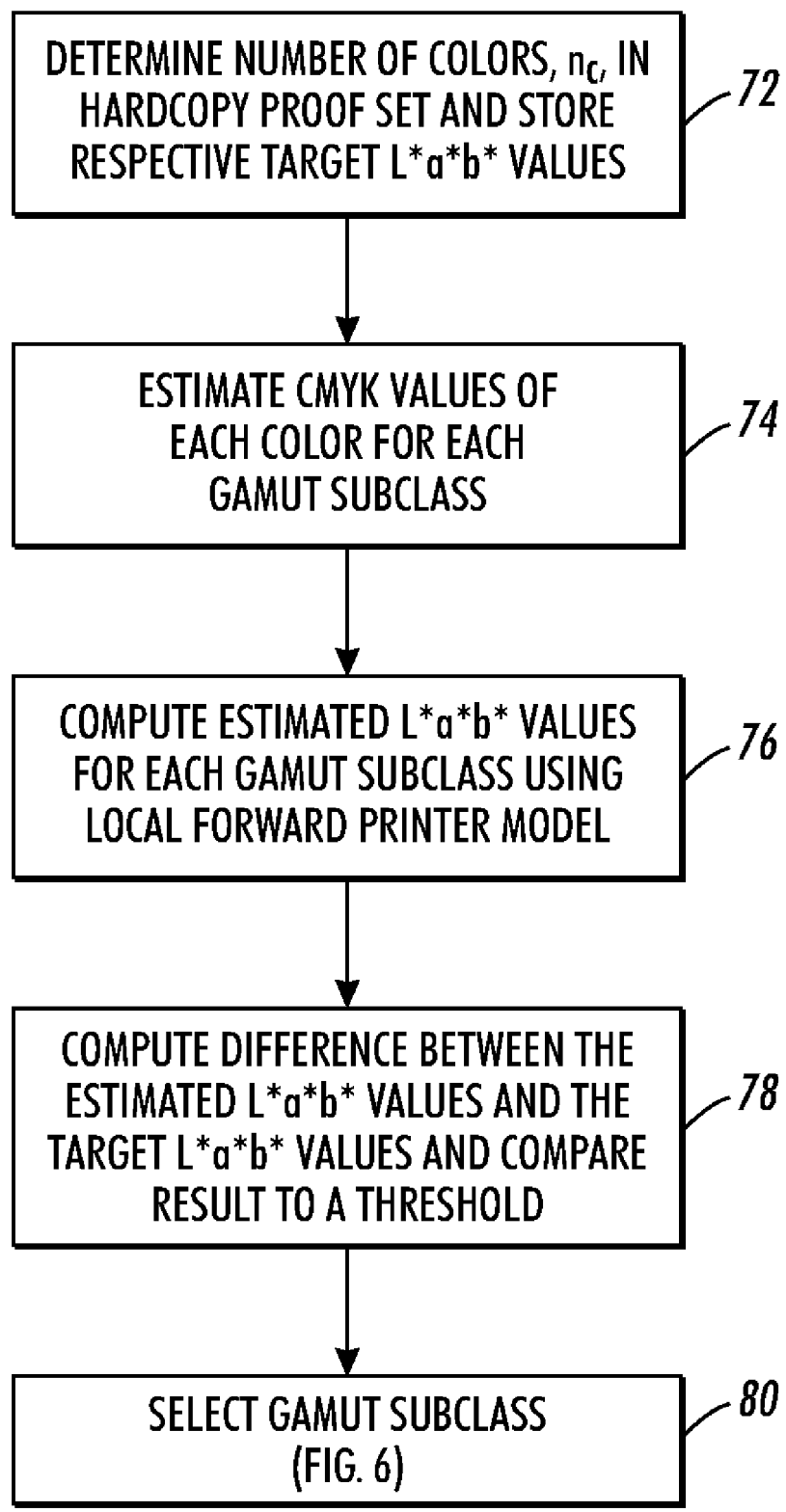

With reference to FIG. 7, the key steps proposed in this method are as follows:

1. Determine 72 the number of colors, $n_c$, in the hard copy proof set and store their respective target L*a*b* values.

It is to be noted that the target L*a*b* values can also be obtained from the electronic proofs.

Figure 4:
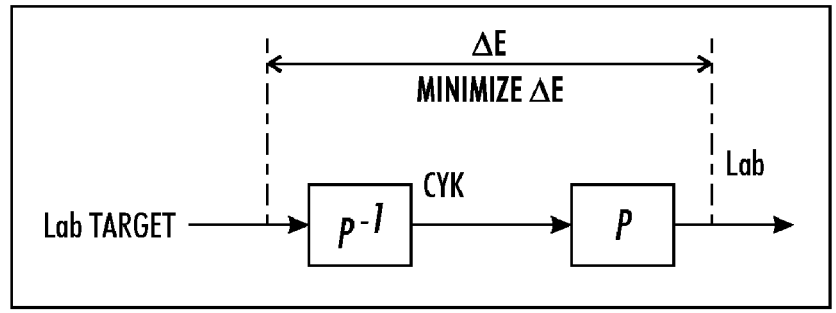
FIG. 4 is a model diagram of a control algorithm for identifying spot color locations relative to gamut boundaries.

2. Estimate 74 the CMYK values of each color $i \in \{1, 2, \ldots, n_c\}$ for each gamut class: The ICI algorithm is used for this purpose. The inputs passed to the ICI algorithm are the forward printer model and the target L*a*b* values. (FIG. 4) The outputs returned by the algorithm are the estimated CMYK values associated to each target L*a*b* There will be four estimated values for each color since this is done for each gamut class. Therefore, $CMY_i$, $CMK_i$, $CYK_i$ and $MYK_i$ values have been obtained for each color i. Notice that the color that does not appear in the 3-color gamut class is held to 0. The gamut classes to allow for a unique solution for each spot target 3. Compute 76 the estimated $L^*a^*b^*_i$ values for each $CMY_i$, $CMK_i$, $CYK_i$ and $MYK_i$ values using the forward printer model.

4. Compute 78 the difference between the estimated L*a*b* i values and the target $L^*a^*b^*_i$ ones and compare this result to a threshold: The difference, dE, between the estimated and target values can be computed by either the CIE LAB or the deltaE2000 formula. This result is compared against a deltaE threshold Th. If the value is greater than Th, then the color i is considered to be outside the gamut class. Otherwise, color i is inside or on the boundary of the gamut class. This is executed for each gamut class so the method returns the following variables: a flag that indicates if the color i is inside/on-boundary ($F_i^{CMY}$=1) or outside ($F_i^{CMY}$=0) of gamut CMY and the $dE_i^{CMY}$; a flag $F^{CMK}$ that indicates if the color i is inside/on-boundary {$F_i^{CMK}$=1) or outside ($F_i^{CMK}$=0) of gamut CMK and the $dE_i^{CMK}$; a flag $F^{CYK}$ that indicates if the color i is inside/on-boundary ($F_i^{CYK}$=1) or outside ($F_i^{CYK}$=0) of gamut CYK and the $dE_i^{CYK}$; a flag $F^{MYK}$ that indicates if the color i is inside/on-boundary ($F_i^{MYK}$=1) or outside ($F_i^{MYK}$=0) of gamut MYK and the $dE_i^{MYK}$.

5. Gamut class selection: If color i is inside or on the boundary of two or more gamut classes, a gamut class selection algorithm will decide 80 the best gamut class that will be used by the ASCE control algorithm.

Simulation Results

Case 1: Colors Near the Gamut's Boundary:

Randomly chosen 5000 test colors that are located on the boundary of each gamut class are used. The forward printer model for each class was obtained by printing a 13 cube CMYK->L*a*b* on an iGen machine. A comparison of how well the proposed invention performed to an alternative method is made. The deltaE2000 formula and a threshold Th=0.1 for the method is made. The results are shown in Table 2.

TABLE 2

| | CMY | | CYK | | CMK | | MYK | |
|---|---|---|---|---|---|---|---|---|
| | No. colors detected on boundary | Accuracy (%) | No. colors detected on boundary | Accuracy (%) | No. colors detected on boundary | Accuracy (%) | No. colors detected on boundary | Accuracy (%) |
| ICI | 5000 | 100 | 4975 | 99.5 | 4987 | 99.74 | 4981 | 99.6 |
| Ray-Tracing | 3770 | 75.4 | 2037 | 40.7 | 2058 | 40.2 | 2056 | 41.12 |

As it can be seen in Table 2, ICI surpasses the Ray-Tracing algorithms in determining how many colors out of the 5000 ones are on the boundary of all gamut classes. In particular, the improvement for the CMK, CYK, and MYK gamut classes is slightly greater than 100% whereas the improvement for the CMY gamut class is about 30%.

Evaluating the impact of wrongly reporting colors as outside the gamut when they are not outside is now shown. Three colors were printed on a machine and measured. Table 3 shows the results using ICI and Ray-Tracing algorithms. The second column shows the L*a*b* values of the spot colors. The third and fourth columns show the results, coded as labels, for ICI and Ray-Tracing methods respectively. In these columns the algorithms report the spot colors that are inside of any specific gamut (e.g., lcmy, lcyk means that, that particular color has been detected inside of the gamut classes CMY and CYK). When any algorithm detects that the spot color under study is not inside of any gamut class, then it will be reported as Oall, i.e., outside all gamuts. The fifth column shows the mapped L*a*b* values of the spot colors that are detected outside of all the gamut classes by Ray-Tracing and the sixth column shows the deltaE2000 value between the spot color and the mapped spot color for those cases when it is needed to do so.

TABLE 3

| Color # | Spot Colors | | | ICI (colors inside/outside gamuts) | Ray-Tracing (colors inside/outside gamuts) | Spot Colors Mapped when detected outside the gamut by Ray-Tracing | | | dE2000 b/w Spot Colors and Mapped ones |
|---|---|---|---|---|---|---|---|---|---|
| | L* | a* | b* | | | L* | a* | b* | |
| 1 | 62.57 | −27.59 | −43.97 | Icmy & Icmk | Oall | 60.08 | −30.31 | −47.45 | 2.5 |
| 2 | 59.69 | 48.71 | 62.13 | Imyk | Oall | 60.82 | 44.01 | 55.16 | 2.2 |
| 3 | 51.65 | 63.99 | 49.60 | Imyk | Lmyk | N/A | N/A | N/A | N/A |

The points to highlight are as follows:
1. Color #1 has been detected inside gamut classes CMY & CMK by ICI. The Ray-Tracing reports this color as outside of any gamut class so that this color needs to be mapped to the surface of the printer gamut. The mapping is done by selecting the minimum deltaE2000 value between the mapped spot color and all the boundaries of the gamut classes. The deltaE2000 value between the mapped color and the original spot color is 2.5 so the color that will be produced by the ASCE control algorithm will be off by 2.5 from the original one. This color difference could be even worsened depending on the printer noise and the sensor's precision. This entire situation can be avoided if the color is correctly reported as inside the gamut class, as is the case with ICI approach (see column 3 in Table 3). Moreover, ICI offers the advantage of having two gamut classes that could be used to reproduce the color.
2. The result for color #2 is similar to color #1. The color reproduced by Ray-Tracing will be 2.2 deltaE2000 off from the original color.
3. There is no difference on the results of color #3 for both methods.

Next, the three colors are printed and with the same CMYK values considered in Table 2 one more time, and measured with the same sensor. The L*a*b* values as well as the results of both algorithms are shown in Table 4.

TABLE 4

| Color # | Spot Colors | | | ICI (colors inside/outside gamuts) | Ray-Tracing (colors inside/outside gamuts) | Spot Colors Mapped when detected outside the gamut by Ray-Tracing | | | dE2000 b/w Spot Colors and Mapped ones |
|---|---|---|---|---|---|---|---|---|---|
| | L* | a* | b* | | | L* | a* | b* | |
| 1 | 61.59 | −27.77 | −44.90 | Icmy & Icmk | Oall | 59.99 | −29.36 | −45.86 | 1.5 |
| 2 | 59.84 | 48.58 | 63.16 | Imyk | Oall | 55.67 | 45.71 | 58.72 | 4.0 |
| 3 | 50.92 | 65.03 | 50.98 | Imyk | Oall | 52.46 | 63.54 | 49.94 | 1.6 |

As expected, the L*a*b* values are slightly different this time because of the sensor and printer differences. Points to highlight are:
1. The results, in terms of color location (i.e., in or out of gamut), for both methods are the same as in Table 2 for colors #1 and 2. The deltaE2000 values for colors #1 and 2 are 1.5 and 4.0 respectively. Thus, there will still be color differences if Ray-Tracing method is used.
2. Color #3 is detected inside gamut class MYK by ICI. In this occasion, color #3 has been detected outside of all gamut classes by the Ray-Tracing method, resulting in 1.6 deltaE2000 color difference with respect to the original spot color. This situation did not happen with this color in Table 2.

Case 2: Colors Outside the Gamut's Boundary:

The ICI algorithm is able to perform the mapping of colors that are outside of the printer's gamut. Table 5 shows the result for ten colors selected arbitrarily outside the printer's gamut. The mapping to preserve minimum deltaE criteria is an outcome of running the ICI algorithm with the method above (FIG. 7).

TABLE 5

| Color* | L* | a* | b* | Mapped L* w/ICI | Mapped a* w/ICI | Mapped b* w/ICI |
|---|---|---|---|---|---|---|
| 1 | 88.60 | −9.65 | −15.45 | 88.04 | −9.54 | −15.06 |
| 2 | 97.94 | −6.85 | 42.06 | 97.57 | −7.06 | 42.02 |
| 3 | 95.11 | −6.93 | 87.17 | 94.17 | −7.41 | 87.13 |
| 4 | 92.23 | −1.11 | 116.68 | 94.48 | −8.19 | 109.36 |
| 5 | 10.95 | −0.51 | −0.87 | 11.00 | −0.20 | −1.06 |
| 6 | 68.87 | −22.23 | −38.20 | 68.23 | −22.46 | −37.49 |
| 7 | 98.27 | 0.47 | −1.52 | 98.27 | 0.47 | −1.52 |
| 8 | 48.94 | −27.28 | −57.27 | 48.57 | −27.63 | −56.28 |
| 9 | 42.01 | −21.59 | −60.65 | 45.22 | −20.21 | −56.15 |
| 10 | 90.48 | 14.61 | −5.21 | 90.37 | 14.57 | −5.08 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for classifying a color printer gamut into a plurality of gamut classes with improved spot color accuracy, including:
 in a color printer having an automated spot color editor comprising an algorithm module;
 classifying the color printer gamut by representing the color printer gamut as a composite of gamut classes and a neutral zone, wherein said neutral zone is an area of overlap between the gamut classes and each gamut class is comprised of a subset of printer color separations;
 implementing said algorithm module for estimating CMYK values for each spot color target and determining if the selected spot color target is located inside, or on-boundary or outside of the gamut classes by computing the difference between the estimated CMYK values and target values and comparing the result to a threshold, wherein values greater than the threshold are located outside the gamut classes, and values less than said threshold are located either inside or on-boundary; and assigning selected spot color targets to selected gamut classes with the spot color editor, wherein the assigning includes identifying an overlap of the gamut classes for a selected one spot color target and using an assigned gamut class with black separation color when the selected one is inside the neutral zone.

2. The method of claim 1 wherein the assigning one of the selected spot color targets comprises holding at least one of the printer color separations to zero.

3. The method of claim 1 further including identifying if the selected spot color target is within a plurality of the gamut classes and computing a distance deltaE between the selected spot color target and a neutral axis.

4. The method of claim 3 further including selecting one of the identified plurality of gamut classes for the selected spot color target having a highest degree of accuracy.

5. The method of claim 4 wherein the assigning based on the highest degree of accuracy includes determining the gamut class having the lowest deltaE value.

6. The method of claim 1 wherein the dividing includes forming gamut classes CMY->L*a*b*, MYK->L*a*b*, CYK->L*a*b* and CMK->L*a*b*.

7. The method of claim 1 wherein the determining includes estimating color separation values associated with the selected spot color target with a local model of the color printer, identifying a difference between the selected spot color target and the estimated color separation values, and comparing the difference with a predetermined threshold.

8. The method of claim 1 wherein the assigning selected spot color targets includes implementing an input/output control algorithm corresponding to the subset of printer color separations.

9. The method of claim 8 wherein the implementing comprises a three input, three output MIMO control algorithm.

10. A method of operating a printer including partitioning a printer gamut comprising a first set of color separations into gamut classes and a neutral zone comprising overlapping subsets of the first set, respectively, for selectively printing spot colors from the gamut classes, including:

in a printer, having an automated spot color editor for identifying a gamut class comprising a portion of the printer gamut capable of producing a selected spot color with a lesser number of color separations than the first set of color separations;

providing an algorithm module for estimating CMYK values for each spot color target until a quality level is reached, and determining if the selected spot color target is located inside, or on-boundary or outside of the gamut classes by computing the difference between the estimated CMYK values and target values and comparing the result to a threshold, wherein values greater than the threshold are located outside the gamut classes, and values less than said threshold are located either inside or on-boundary;

assigning selected spot color targets to selected gamut classes with the spot color editor, wherein the assigning includes identifying an overlap of the gamut classes for a selected one spot color target and using a gamut class with black separation color when the selected one is inside the neutral zone, and using a CMY gamut class for colors outside the neutral zone; and printing a selected spot color determined from the gamut class.

11. The method of claim 10 wherein the identifying a portion includes classifying a set of colors printable with one of a set of color separations of either CMY, CMK, CYK or MYK.

12. A printer including an automated spot color editor that assigns selected spot color targets to one of a plurality of printer gamut subclasses, cumulatively forming the overall printer gamut, comprising:

an algorithm module including at least one algorithm for estimating CMYK values for each spot color target that classifies the overall printer gamut as the plurality of the printer gamut subclasses, wherein each subclass holds one printer color separation of zero, and identifies a neutral zone including overlapping areas of the subclasses, that determines if the selected spot color target is located inside, or on-boundary or outside of the printer gamut subclasses by computing the difference between the estimated CMYK values and target values and comparing the result to a threshold, wherein values greater than the threshold are located outside the gamut subclasses, and values less than said threshold are located either inside or on-boundary, and that assigns the selected spot color targets to selected subclasses based on a computed accuracy relationship between the selected spot color target and a neutral axis of the printer gamut.

13. The printer of claim 12 wherein the subclasses include forming gamut classes CMY->L*a*b*, MYK->L*a*b*, CYK->L*a*b* and CMK->L*a*b*.

* * * * *